(12) United States Patent
Xi et al.

(10) Patent No.: US 10,152,316 B2
(45) Date of Patent: *Dec. 11, 2018

(54) MOBILE APPLICATION PROCESSING

(71) Applicant: Alibaba Group Holding Limited, George Town (KY)

(72) Inventors: Chao Xi, Beijing (CN); Yue Zhang, Beijing (CN); Huan Zeng, Beijing (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,703

(22) Filed: Dec. 20, 2016

(65) Prior Publication Data

US 2017/0102935 A1    Apr. 13, 2017

Related U.S. Application Data

(63) Continuation of application No. 14/823,160, filed on Aug. 11, 2015, now Pat. No. 9,557,982.

(30) Foreign Application Priority Data

Aug. 14, 2014    (CN) .......................... 2014 1 0399979

(51) Int. Cl.
　　*G06F 9/44*　　　(2018.01)
　　*G06F 8/65*　　　(2018.01)
　　*G06F 8/61*　　　(2018.01)
　　*G06F 9/445*　　(2018.01)

(52) U.S. Cl.
　　CPC .................. *G06F 8/65* (2013.01); *G06F 8/61* (2013.01); *G06F 9/44526* (2013.01)

(58) Field of Classification Search
　　CPC ........... G06F 8/65; G06F 8/61; G06F 9/44526
　　USPC ......................................................... 717/168
　　See application file for complete search history.

(56) References Cited

U.S. PATENT DOCUMENTS

| | | |
|---|---|---|
| 5,903,728 A | 5/1999 | Semenzato |
| 6,006,279 A | 12/1999 | Hayes |
| 7,246,351 B2 | 7/2007 | Bloch |
| 7,433,935 B1 | 10/2008 | Obert |
| 7,562,369 B1 | 7/2009 | Salamone |
| 7,703,092 B1 | 4/2010 | Glaser |
| 7,899,959 B2 | 3/2011 | Anwer |
| 8,046,692 B2 | 10/2011 | Pogrebinsky |

(Continued)

FOREIGN PATENT DOCUMENTS

| | | |
|---|---|---|
| CN | 101291305 | 10/2008 |
| CN | 102830992 | 12/2012 |

(Continued)

*Primary Examiner* — Anna C Deng
(74) *Attorney, Agent, or Firm* — Van Pelt, Yi & James LLP

(57) ABSTRACT

Embodiments of the present application relate to a method, apparatus, and system for processing an app. The method includes obtaining a plugin identifier, obtaining an app plugin installation package from a server, wherein the app plugin installation package is associated with the plugin identifier, installing the app plugin installation package, obtaining an app plugin lookup instruction associated with an app plugin, and determining the app plugin according to the app plugin lookup instruction, wherein the app plugin implements a specific function of a corresponding app in response to the app plugin being invoked.

19 Claims, 6 Drawing Sheets

(56) References Cited

U.S. PATENT DOCUMENTS

| | | |
|---|---|---|
| 8,185,869 B2 | 5/2012 | Bou-Ghannam |
| 8,572,138 B2 | 10/2013 | Sundar |
| 8,776,047 B2 | 7/2014 | Wookey |
| 2004/0203690 A1 | 10/2004 | Sprigg |
| 2005/0229104 A1 | 10/2005 | Franco |
| 2006/0218488 A1 | 9/2006 | Shah |
| 2007/0240134 A1* | 10/2007 | Buragohain ........ G06F 9/44526 717/140 |
| 2008/0022292 A1 | 1/2008 | Gibson |
| 2008/0189651 A1 | 8/2008 | Reveman |
| 2008/0295074 A1* | 11/2008 | Schneider ................ G06F 8/36 717/120 |
| 2010/0146379 A1 | 6/2010 | George |
| 2010/0223306 A1* | 9/2010 | Liu .................... G06F 9/44505 707/822 |
| 2011/0047220 A1 | 2/2011 | Lee |
| 2011/0126192 A1 | 5/2011 | Frost |
| 2011/0138025 A1* | 6/2011 | Kobi ........................ G06F 9/50 709/221 |
| 2012/0159145 A1 | 6/2012 | Cheong |
| 2013/0191495 A1 | 7/2013 | Almstrand |
| 2013/0191526 A1 | 7/2013 | Zhao |
| 2014/0333525 A1 | 11/2014 | Gromes, Sr. |
| 2014/0337148 A1 | 11/2014 | Kannan |
| 2015/0052509 A1 | 2/2015 | Wang |
| 2015/0113525 A1 | 4/2015 | Sun |
| 2015/0195263 A1 | 7/2015 | Wilson |
| 2015/0244579 A1* | 8/2015 | Birk ........................ H04L 67/10 709/223 |
| 2016/0004527 A1 | 1/2016 | Udd |

FOREIGN PATENT DOCUMENTS

| | | |
|---|---|---|
| CN | 103399792 | 11/2013 |
| CN | 103593201 | 2/2014 |
| WO | WO 2002097610 | 12/2002 |
| WO | WO 2014067412 | 5/2014 |

* cited by examiner

200

MOBILE APPLICATION PROCESSING

CROSS REFERENCE TO OTHER APPLICATIONS

This application is a continuation of co-pending U.S. patent application Ser. No. 14/823,160, entitled MOBILE APPLICATION PROCESSING filed Aug. 11, 2015 which is incorporated herein by reference for all purposes, which claims priority to People's Republic of China Patent Application No. 201410399979.4 entitled AN APP PROCESSING METHOD AND DEVICE, filed Aug. 14, 2014 which is incorporated herein by reference for all purposes.

FIELD OF THE INVENTION

The present application relates to a field of computer technology. In particular, the present application relates to a method and device to process an app on a mobile terminal.

BACKGROUND OF THE INVENTION

An app is a type of application software that is supported by and runs on software platforms. Apps can be characterized according to the software platform on which the app is executed. For example, apps can be Android system apps, website apps, and Apple (iOS) system apps, or the like.

Various users generally have different functional needs with regard to the same app. For example, in the case of the "Contacts" app, some users only expect to use a "View contact information" function or a "Most recent calls" function of the "Contacts" app, and other users expect to use multiple functions such as a "Private collection" function, a "View contact information" function, and a "Most recent calls" function.

However, currently, a uniform app has the same functions on the respective terminals of the various users regardless of the particular functions of the app that are desired by the respective user. For example, when different user terminals install (or update) the same app, all of the user terminals are required to download the entire installation package associated with the app and use the downloaded entire installation package for installing (or updating) the app. As a result, the apps that are installed on the different user terminals have the same functions and take up the same amount of storage space and memory, even though many users only need subsets of the functions the app provides.

In view of the above, currently, apps suffer from relatively poor flexibility, which can result in poor matches between installed apps and the functions that users need from apps.

BRIEF DESCRIPTION OF THE DRAWINGS

Various embodiments of the invention are disclosed in the following detailed description and the accompanying drawings.

The drawings described here are intended to further the understanding of the present application and form a part of this application. The illustrative embodiments of the present application and the descriptions thereof are intended to explain this application and do not constitute inappropriate limitation of the present application. Among the drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments solve the problems associated with limited flexibility of apps and the resulting possible mismatch between installed apps and the app functions needed by users.

Figure 1:
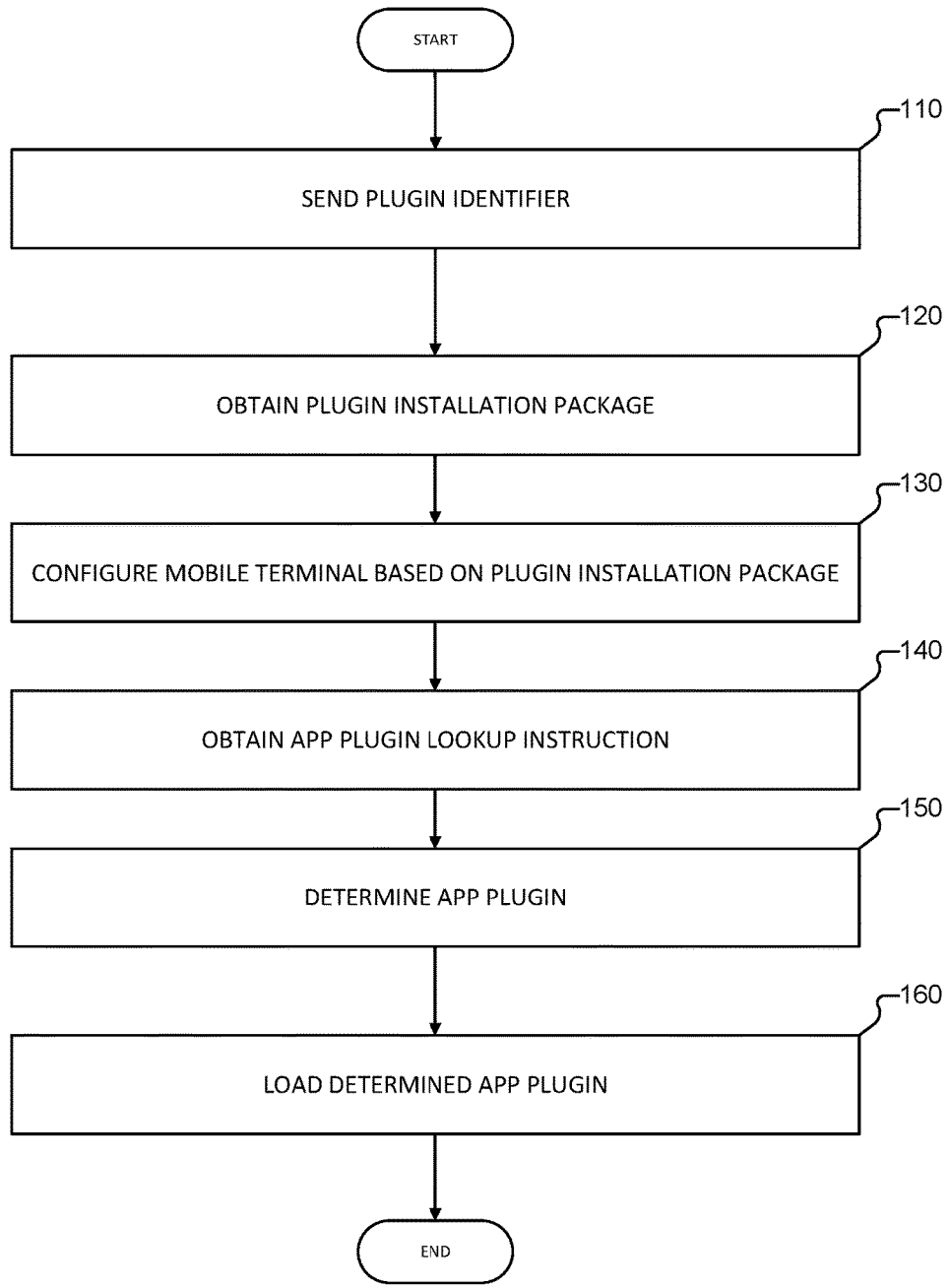
FIG. 1 is a flowchart of an app processing method according to various embodiments of the present application.

FIG. 1 is a flowchart of an app processing method according to various embodiments of the present application.

Referring to FIG. 1, a process 100 for processing an app is provided. Process 100 can be implemented by device 300 of FIG. 3, system 400 of FIG. 4, or computer system 500 of FIG. 5. Process 100 can be implemented using a terminal such as a mobile terminal. Process 100 is described in connection with a mobile terminal, however, process 100 can be implemented using other terminals such as a PC.

At 110, a plugin identifier is obtained.

In some embodiments, the plugin identifier is associated with a set of one or more functions of an app used on the mobile terminal. In some embodiments, the plugin identifier is defined by the plugin platform. For example, the plugin application package name can be set as com.android.contacts.plugin.xyz, wherein com.android.contacts.plugin is used as a fixed prefix, including the application package for the fixed prefix plugin application package, and xyz corresponds to the name of the plugin. As an example, the plugin application package can be represented as com.android.contacts.plugin.weather (e.g., "weather" corresponds to the name of the plugin). According to various implementations, a mobile terminal can correspond to a mobile phone, a tablet, a laptop, or the like. The mobile terminal can send the plugin identifier to the server of a network such as a Local Area Network (LAN), a Wide Area Network (WAN), a telecommunications network, the like, or any combination thereof. For example, the plugin identifier can be configured according to user settings or preferences. The plugin identifier can be configured according to user selection of the set of functions of the app. Accordingly, in various embodiments, the user can define the plugin identifier to be associated with a set of desired functions of an app installed (or to be installed) on the mobile terminal. In some embodiments, the user can select the set of functions of apps locally installed on the user's terminal (e.g., the mobile terminal).

In some embodiments, the mobile terminal can receive a plugin identifier from another terminal. For example, the mobile terminal can receive a plugin identifier from the server. The plugin identifier received by the terminal can be provided (e.g., displayed) to a user. For example, in the event that the plugin identifier is received from the server before the mobile terminal communicates the plugin identifier to the server, the mobile terminal can display the plugin identifier, or information included in the plugin identifier, to the user. The mobile terminal can provide the plugin identifier, or information included in the plugin identifier, to the user such that the set of functions corresponding to an app is displayed.

In some embodiments, a mobile terminal sends the plugin identifier to a server. In some embodiments, the mobile terminal receives a plugin identifier selection instruction (e.g., an Android HTTP GET request) and, in accordance with the plugin identifier selection instruction, selects a plugin identifier from among at least one of the plugin identifiers sent by the server, and sends the selected plugin identifier to the server. For example, a set of plugin identifiers can be presented to a user and the user can select one or more of the set of plugin identifiers. In response to receiving the user selection of the one or more plugin identifiers, the mobile terminal can send the selection of the one or more plugin identifiers to the server. The set of plugin identifiers can include a plurality of plugin identifiers that respectively correspond to different sets of functions associated with an app. For example, the plurality of plugin identifiers can be associated with the same app such that the plurality of plugin identifiers correspond to different functionalities of the app (e.g., the plurality of plugin identifiers associated with the same app can have varying scopes of functionalities). As another example, the plurality of plugin identifiers can be associated with one or more apps such that the plurality of plugin identifiers correspond to functionalities of different apps.

In some embodiments, the mobile terminal displays plugin descriptive information corresponding to at least one app plugin sent by the server. The plugin descriptive information may comprise the name or type of the app that the app plugin is adapted to, a description of the functions that can be implemented by the plugin, or a description of the app version number. The mobile terminal can receive a plugin selection instruction. For example, the terminal can receive the plugin selection instruction from a user via, for example, a user interface. The plugin selection instruction can comprise information indicating a selected app plugin. The plugin selection instruction can be generated in response to receiving an input indicating a selected app plugin from the user. In some embodiments, an app plugin can be selected by the mobile terminal based on stored defined settings or preferences. For example, in response to receiving a request to select an app plugin (which does not necessarily specify the specific plugin), the mobile terminal can automatically select an appropriate app plugin according to the defined settings or preferences. As another example, in response to receiving a request to select an app plugin, the mobile terminal can select the app plugin according to a manual selection by a user. The mobile terminal can send the plugin identifier corresponding to the selected app plugin to the server. For example, the mobile terminal can send the plugin identifier corresponding to the selected app plugin in response to selection of an app plugin.

At 120, a plugin installation package is obtained. The mobile terminal can obtain the plugin installation package from the server. As used herein, the plugin installation package refers to an installation package of an app plugin corresponding to the plugin identifier communicated by the mobile terminal (e.g., the plugin identifier corresponding to the selected app plugin). For example, the plugin installation package can be a .apk file. For JAVA-based apps, the plugin installation package can be a .jar file.

At 130, the mobile terminal is configured based on the plugin installation package. In some embodiments, the mobile terminal installs the plugin installation package. For example, in response to receiving the plugin installation package from the server, the mobile terminal can be configured using the plugin installation package.

In some embodiments, the app plugin can cause a mobile terminal to implement partial functions of an app. For example, in the event that the app plugin is run (e.g., executed), the partial functions of an app can be implemented. According to various embodiments, the partial functions correspond to a set of functions that the user wants the app to provide. For example, the set of functions can be user-defined according to user selection, user preferences, or user settings. The partial functions refers to one or more of all functions associated with (e.g., provided by) an app, and not to all of the functions of the app. The partial functions corresponds to a subset of functions of an app that is less than all functions of an app. In some embodiments, the corresponding application-specific functions are locally installed features not available by calling the plug-in extensions installed for native applications. The plugin identifier may be a character identifier, a signal identifier, a string, the like, or any combination thereof.

In some embodiments, the installing of the plugin installation package comprises determining whether the plugin installation package is compatible with the local operating system of the mobile terminal based at least in part on an interface identifier in the plugin installation package. In the event that the plugin installation package (e.g., the interface identifier in the plugin installation package) is compatible with the local operating system of the mobile terminal, the plugin installation package is run (e.g., executed). The interface identifier in the plugin installation package is used to indicate the local operating system that is compatible with the plugin installation package. Interface identifiers can be mapped to identifiers of compatible operating systems. For example, the mobile terminal can store a set of one or more interface identifiers that are compatible with the operating system of the mobile terminal. As another example, in response to obtaining the plugin installation package, the mobile terminal can obtain (e.g., extract) the interface identifier associated with the plugin installation package, and the mobile terminal can query a storage location of the set of one or more interface identifiers to the compatible operating system to determine whether the plugin installation package is included in the set (i.e., compatible with the operating system of the mobile terminal.)

Various types of app plugins can be installed on a terminal in accordance with user or app needs. After the app plugin has been installed on the mobile terminal, the app plugin can be used. If in the course of using the app plugin, a required app plugin is determined to have not been installed, 110-130 of process 100 can be performed to continue with installation of the required app plugin.

140 and 150 below can be performed in connection with using an app plugin.

At 140, an app plugin lookup instruction is obtained. A corresponding app plugin lookup instruction can be obtained in connection with use of an app plugin. The app plugin lookup instruction can be a function that instructs the app to look up an app plugin.

In some embodiments, the app plugin lookup instruction is obtained in response to the app being opened. For example, in response to receiving an input from a user to run an app on the mobile terminal, the app code will generate the app plugin lookup instruction.

In some embodiments, the app plugin lookup instruction can be obtained in response to a new app plugin being installed on the mobile terminal or an app plugin being uninstalled from the mobile terminal. For example, in response to a new app plugin being installed, the app code will generate the corresponding app plugin lookup instruction.

At 150, an app plugin is determined. In some embodiments, the app plugin is determined according to a function to be performed (e.g., a specific function requested by the user or mobile terminal). A specific function can be implemented by invoking the app plugin which was determined.

In some embodiments, if a new app plugin is installed on the mobile terminal, then the corresponding app plugin lookup instruction (which can be obtained by the app in response to installation of the new app plugin) is used to determine whether the app can invoke the newly installed app plugin. In some embodiments, if an app plugin is uninstalled from the mobile terminal, then using the corresponding app plugin instruction to determine whether an app plugin can be invoked by the app avoids invalid invocation of an uninstalled app plugin.

In some embodiments, the app plugin is determined by determining the app identifier according to the app plugin lookup instruction, and determining, from among locally installed app plugins, the app plugin having a plugin identifier that matches the app identifier. For example, in the event that the app identifier associated with the app plugin lookup instruction is located (e.g., in an app registration table or the like), the app identifier can be used to identify an app installed on the mobile terminal that corresponds to the app identifier associated with the app plugin lookup instruction. In some embodiments, the app identifier can be looked up in an app registration table storing mappings of app plugin lookup instructions to app identifiers. The app registration table can be stored locally on the mobile terminal, or can be stored remotely and queried by the mobile terminal. The mobile terminal can use the app plugin lookup instruction to look up the app identifier in an app registration table.

In some embodiments, the app plugin is determined based at least in part on the plugin that is responsive to the app plugin lookup instruction. For example, the app plugin that responds to the app plugin lookup instruction can be determined to be the app plugin to use in connection with use of the app. In some embodiments, after obtaining the app plugin lookup instruction, the app sends request signals to each locally installed app plugin. The request signal can be sent via a broadcast. For example, the message can be sent via an inter-process communication. If an app plugin responds to the request signal, then the app's plugin can be determined. The request signal sent by the app can include an app identifier. The app identifier can be used to enable the app plugin to determine whether the identifier of the app plugin matches the app identifier included in this signal. For example, in response to receiving the request signal from the app, a particular app plugin can compare an app identifier included in the request signal with an identifier associated with the particular app plugin. In the event that the identifier of the app plugin matches the app identifier included in the request signal, the app plugin responds to the request signal. For example, in response to the app plugin determining that the app identifier included in the request signal matches the identifier associated with the particular app plugin, the app plugin responds to the request signal. In the event that the identifier of the plugin does not match the app identifier included in the request signal, the app plugin does not respond to the request signal.

In some embodiments, after determining the app plugin, the app plugin that was determined is processed. For example, after determining the app plugin, the app plugin can be updated, deleted, or run according to the function that invoked the app plugin.

At 160, the app plugin is loaded. The determined app plugin can be loaded into an app configuration file. Specifically, the path to the app plugin can be added to an app configuration file. A service or application can include various information, including the application package name, and application configuration information through the package manager. Such information can be added to an app configuration file. According to various embodiments, the path to the app plugin is added to the app configuration file after loading to get the plugin platform application's configuration file. The app plugin can be loaded into a corresponding app configuration file before the app plugin is run. The app plugin can be loaded into the corresponding app configuration file in connection with the initialization of the app plugin. According to various embodiments, 160 is optionally performed.

In some embodiments, multiple plugins corresponding to the same app can be allocated with the same process identifier during execution. Plugins with the same process identifier can access each other's resources (e.g., memory, database, etc.) during execution. Take the example of an app plugin adapted to an Android operating system, each process is assigned an identifier by the operating system. This process identifier is referred to as a UserID. By setting one identifier (UserID) for different app plugins of the same app, a multi-plugin installation package (e.g., Android Package (APK)) having a single UserID can run in a single process. In other words, a multi-plugin APK having a single UserID can run in a single process, and within this single process the multiple app plugins can access resources (e.g., databases and files under the data directory) of any of the other app plugins in the multi-plugin APK.

According to various embodiments, the relative inflexibility in invoking app functions of some related art is ameliorated by sending a function call request to the app plugin that was determined and receiving a function call result sent back by the app plugin that was determined. The function call request can be sent via a first interface to the determined app plugin. A function call result sent back from the determined app plugin can be received via a second interface.

According to various embodiments, limited flexibility and the resulting possible mismatch between installed apps and the app functions needed by users of some related art are ameliorated by sending a plugin identifier to a server, requesting and acquiring an app plugin that can implement specific functions, installing the app plugin, and looking up the app plugin. Various embodiments support the actual needs of the user because local apps have the appropriate functions.

According to various embodiments, the user can update or delete a portion of an app's functions by updating or deleting an app plugin because partial functions of the app can be implemented by a single app plugin. Since a single app plugin is smaller in size than an entire app implementing all possible functions, the update requires less bandwidth for communicating the data required for the update, and the update speed is improved. In contrast, in existing systems, the only way to update or delete a portion of an app's functions is to update or delete an entire app.

110-160 in process 100 can be executed by the same device or different devices. For example, the executing entity of 110 and 120 can be a first device, and the executing entity of 130 and 140 can be a second device. As another example, the executing entity of 130 and 140 can be the first device and the executing entity of 110 and 120 can be the second device. In these examples, the first device can be a server and the second device can be a client.

In some embodiments, a method of installing and running an app (e.g., the "Contacts" app) is performed. In some embodiments, a platform can be used to search for app plugins and to communicate with app plugins. Such a platform can be referred to as a plugin platform.

Figure 2A:
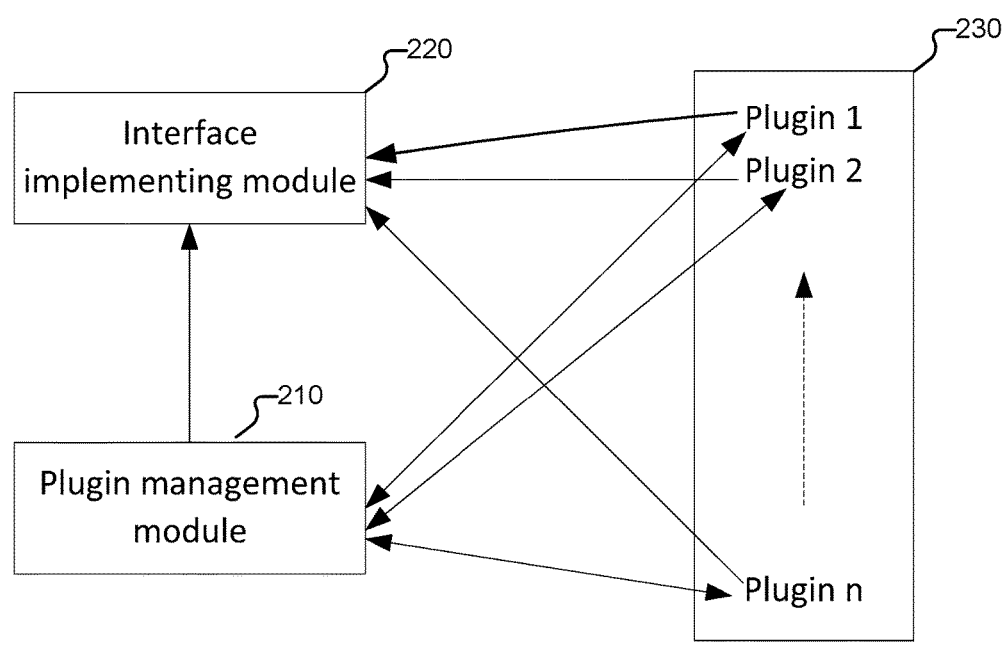
FIG. 2A illustrates a plugin platform according to various embodiments of the present application.
Figure 2B:
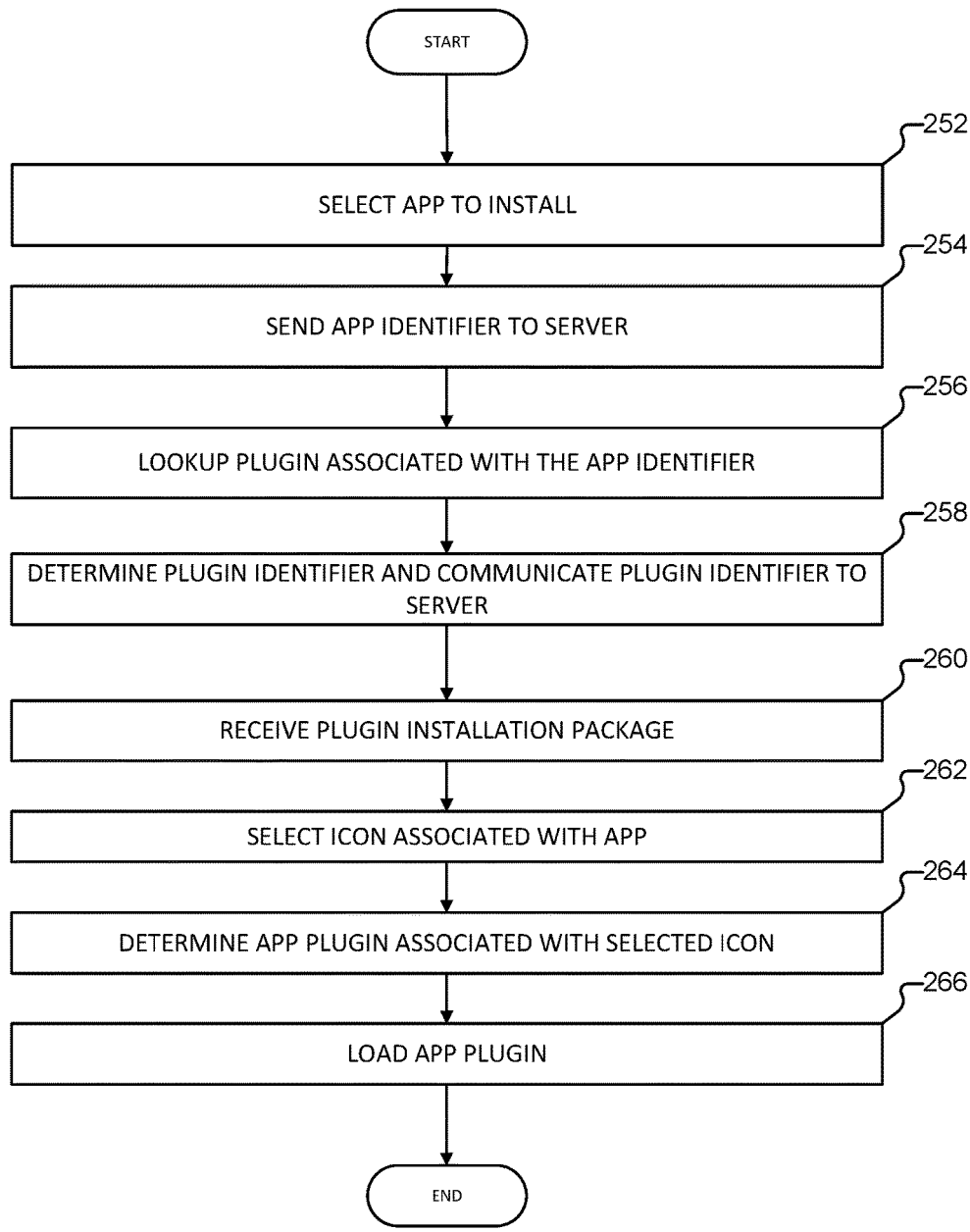
FIG. 2B is a flowchart of a method of installing an app according to various embodiments of the present application.

FIG. 2A illustrates a plugin platform 200 according to various embodiments of the present application. FIG. 2B is a flowchart of a method of installing an app according to various embodiments of the present application.

Plugin platform 200 includes a plugin management module 210, an interface implementing module 220, and one or more app plugins 230. The plugin platform 200 can be used as a stand-alone application for managing (all) the plugins of the device (e.g., the phone). The plugin platform 200 can be implemented as a set of library functions incorporated into the app. For example, a "Contacts" app will incorporate a plugin platform so it can provide different types of plugins. For instance, one of the plugins masks (hides) the call length of a call made to a contact in the mobile device's contact database, and another one of the plugins displays the call length of calls. One of the one or more app plugins 230 can be installed using the plugin management module 210 and the interface implementing module 220.

Referring to FIG. 2B, a process 250 for installing an app is provided. Process 250 can be implemented by device 300 of FIG. 3, system 400 of FIG. 4, or computer system 500 of FIG. 5. Process 250 can be implemented using plugin management module 210 and interface implementing module 220 of FIG. 2A.

At 252, an app to install is selected. The user can use a mobile terminal on which the app (e.g., the "Contacts" app) has not been installed to browse an app store (e.g., Apple App Store™, Google Play™ Store, or the like) and finds an icon, name, link, or other appropriate reference for the app (e.g., the "Contacts" app) that the user wants to install. The mobile terminal receives the selection of an app to install from the user (e.g., the mobile terminal can detect an app selection instruction), and in response to receiving the selection of the app to install, the mobile terminal communicates an indication to a server. For example, the server can host (e.g., store) the app store or the app to install. The user can click on an icon presented by the app store (and displayed by the mobile terminal) and cause the mobile phone to detect an app selection instruction.

At 254, the mobile terminal sends an app identifier corresponding to a selected app to a server. For example, in accordance with the app selection instruction, the mobile terminal sends the app identifier corresponding to the selected app (e.g., the identifier for the "Contacts" app) to the app store.

At 256, an app plugin associated with the app identifier is looked up. In some embodiments, in response to the server (e.g., the app store server) receiving the app identifier, the server queries a database, table, or the like for an app plugin associated with the app identifier. For example, the app store server looks up the app plugin that matches the app identifier sent by the mobile terminal (e.g., the user). In the event that the app store server finds an app plugin that matches the app identifier, the app store server sends information associated with the functions that the (looked up) app plugin can perform to the mobile terminal. In response to receiving the information associated with the functions that the app plugin can display in a user interface screen, the mobile phone can display the information associated with the functions that the app plugin can perform. The user can select the app plugin via, for example, the user interface on the mobile terminal.

The information associated with the functions that the app plugin can perform can be information fetched by the plugin platform from the plugin installation package associated with the app plugin (e.g., the looked up app plugin having an identifier matching the app identifier sent by the mobile terminal).

At 258, the plugin identifier associated with the app plugin selected by the user is determined and communicated. In some embodiments, the plugin management module 210 in the mobile terminal determines the plugin identifier selected by the user and sends the plugin identifier to the app store server. The plugin management module 210 can determine the plugin identifier associated with the app plugin selected by the user in response to the user inputting a selection of the plugin identifier, and the plugin management module 210 can send the plugin identifier to the app store server (e.g., in connection with a request to download the app plugin corresponding to the plugin identifier).

A plugin installation package associated with the plugin identifier is obtained and communicated to the mobile terminal. For example, in the event that the app store server receives the plugin identifier (e.g., the plugin identifier associated with the selected app plugin from the mobile terminal), the app store server obtains (e.g., acquires) the plugin installation package that matches the plugin identifier sent by the mobile terminal and sends the plugin installation package to the mobile terminal.

At 260, the plugin installation package is received. In response to the server sending the plugin installation package that matches the plugin identifier (corresponding to the selected app plugin), the mobile terminal receives the plugin installation package. For example, the interface implementing module 220 of the plugin platform 200 in the mobile terminal receives the plugin installation package sent by the app store server. The mobile terminal (e.g., the interface implementing module 220) can determine whether the plugin installation package is compatible with the operating system of the mobile terminal based at least in part on the plugin installation package received from the app store server. In some embodiments, the plugin installation package includes an interface identifier. When the interface identifier matches the local operating system, the plugin installation package is deemed to be compatible with the local operating system, and the mobile terminal (e.g., the interface implementing module 220) installs the plugin installation package on the mobile terminal.

At 262, a reference (e.g., an icon) associated with the app is selected. The mobile terminal can display an icon associated with the app, and the user can input a selection of the icon associated with the app via an interface of the mobile terminal. For example, if the app is a "Contacts" app, the user clicks on the "Contacts" icon displayed on the mobile terminal.

The icon associated with the app can be displayed on an operating interface (e.g., a graphical user interface) the mobile terminal after the plugin installation package is successfully installed locally on the mobile terminal. The icon associated with the app can be displayed on a particular menu or screen (e.g., a home screen) of the graphical user interface.

In some embodiments, the selection of the icon associated with the app corresponds to an app plugin search instruction input to the mobile terminal. For example, the user's clicking the "Contacts" icon displayed on the mobile terminal invokes the app, which invokes a function to send an app plugin search instruction to the mobile phone. The app plugin search instruction can include the "Contacts" app identifier. In some embodiments, in response to selection of the icon associated with the app, a search for an app plugin is invoked based on the app identifier associated with the selected app (e.g., the app associated with the icon that is selected by the user).

At 264, an app plugin associated with the selected icon is determined. In some embodiments, the plugin management module 210 of the plugin platform 200 in the mobile terminal uses the app identifier (e.g., the "Contacts" identifier) as a basis for determining, from among locally installed plugins, an app plugin associated with a plugin identifier that matches the app identifier (e.g., the "Contacts" identifier).

At 266, the app plugin is loaded. The app plugin's path can be loaded into an app configuration. For example, the path to the location where the app plugin is stored can be loaded into a corresponding app configuration file before the app plugin is run. In some embodiments, the interface implementing module 220 of the plugin platform 200 in the mobile terminal loads the user-selected app plugin into the app (e.g., "Contacts" app) configuration file. When the app is executed, the configuration file is read and the user-selected app plugin is invoked. The interface implementing module 220 of the plugin platform 200 in the mobile terminal can execute the app plugin.

For example, on an Android system, the AndroidManifest.xml file can be implemented to include the following:
<manifest xmlns:android=http://schemas.android.com/apk/res/android
package="com.yunos.alicontacts.plug.Operator"
android.sharedUserId="com.yunos.alicontacts"

The package specifies the path for the plugin to be loaded. The loading of the app plugin to the corresponding app configuration file provides to the user the functions that the selected app plugin can implement. In an example implementation of a plugin such as "com.yunos.alicontacts.plugin.Operator," specific functions (e.g., hiding the length of the call) are implemented in a "run" function as follows:

```
public void run(AHContactsPluginInterface api) {
    api.setHideLengthOfCallMode( );
};
```

According to various embodiments, a user can select, as needed, app plugins for implementing different functions of an app. Enabling a user to select app plugins for implementing different functions of an app provides flexibility to the user and can prevent the problem of the some related art, namely its limited flexibility and the resulting possible mismatch between installed apps and the app functions needed by users.

Similarly, when users wish to update locally installed app functions, users can, by sending a plugin identifier to the app store server, request and acquire app plugins for implementing specific functions of the app and thereupon complete the operation of installing the app locally on the user terminal (e.g., the mobile terminal).

Figure 3:
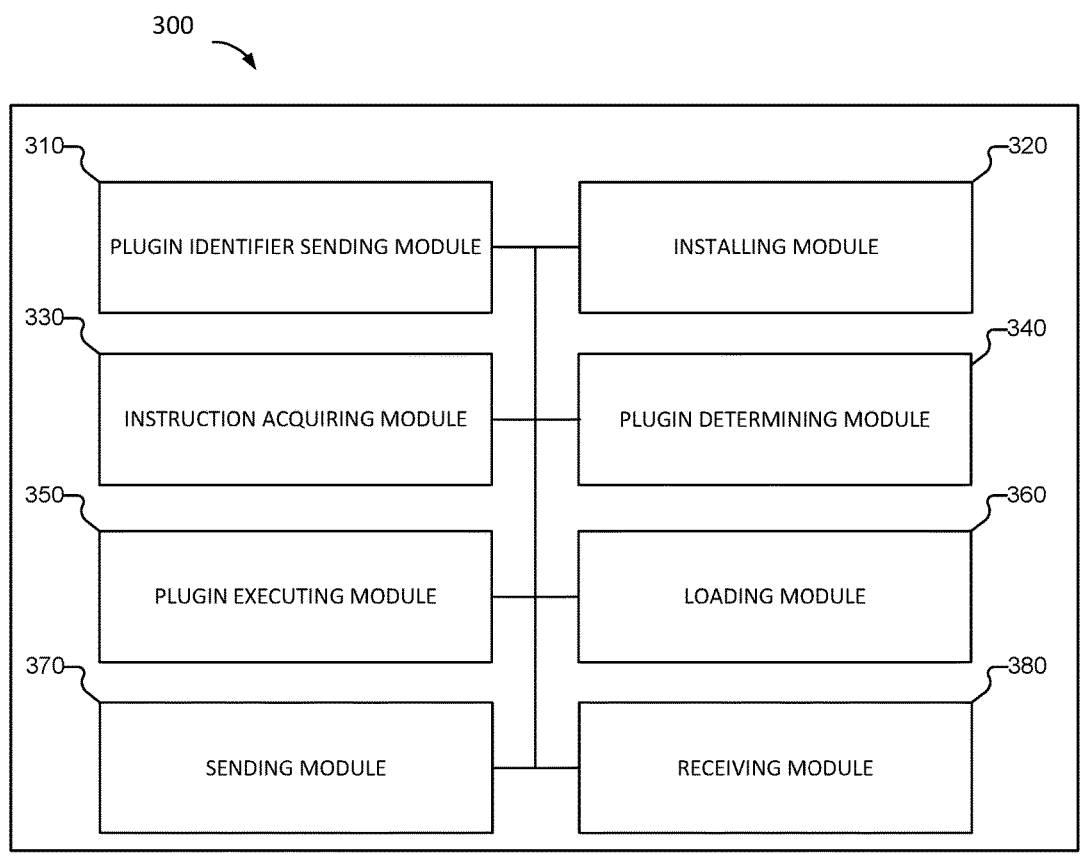
FIG. 3 is a structural diagram of an app processing device according to various embodiments of the present application.

FIG. 3 is a structural diagram of an app processing device according to various embodiments of the present application.

Referring to FIG. 3, an app processing device 300 is provided. App processing device 300 can correspond to, or otherwise be included in, a mobile terminal such as computer system 500 of FIG. 5. App processing device 300 can implement process 100 of FIG. 1 and process 250 of FIG. 2B. App processing device 300 can implement, or otherwise include, the plugin platform 200 of FIG. 2A.

App processing device 300 includes a plugin identifier sending module 310, an installing module 320, an instruction acquiring module 330, and a plugin determining module 340.

The plugin identifier sending module 310 is configured to send a plugin identifier to a server.

The installing module 320 is configured to obtain the plugin installation package sent by the server according to the plugin identifier. For example, the installing module 320 receives the plugin installation package sent by the server. In the event that the installing module 320 obtains the plugin installation package, the installing module 320 can install the plugin installation package (e.g., on the mobile terminal).

The instruction acquiring module 330 is configured to obtain the app plugin lookup instruction. In some embodiments, the instruction acquiring module 330 obtains the app plugin lookup instruction in response to the app being opened. For example, in response to receiving an input from a user to run an app on the mobile terminal, the instruction acquiring module 330 can obtain the app plugin lookup instruction. In some embodiments, the instruction acquiring module 330 obtains the app plugin lookup instruction in response to a new app plugin being installed on the mobile terminal or in response to an app plugin being uninstalled from the mobile terminal.

The plugin determining module 340 is configured to determine app plugins. A locally installed app plugin can implement specific functions by the locally installed app plugin being run. In some embodiments, the app plugin is determined according to a function to be performed (e.g., a specific function requested by the user or mobile terminal). A specific function can be implemented by invoking the app plugin which was determined. An app plugin associated with an app can have a defined subset of functions of the app that is less than all functions of the app.

In some embodiments, the plugin determining module 340 comprises an identifier determining sub-module and a plugin matching sub-module.

The identifier determining sub-module of the plugin determining module 340 is configured to determine the app identifier according to the app plugin lookup instruction.

The plugin matching sub-module is configured to use the app identifier as a basis for determining, from among locally installed app plugins, the app plugin associated with a plugin identifier that matches the app identifier.

In some embodiments, the plugin determining module is configured to determine the app plugin that responds to the app plugin lookup instruction. For example, in response to receiving the request signal from the app, a particular app plugin can compare an app identifier included in the request signal with an identifier associated with the particular app plugin. In the event that the identifier of the app plugin matches the app identifier included in the request signal, the app plugin responds to the request signal. For example, in response to the app plugin determining that the app identifier included in the request signal matches the identifier associated with the particular app plugin, the app plugin responds to the request signal. In the event that the identifier of the app plugin does not match the app identifier included in the request signal, the app plugin does not respond to the request signal.

In some embodiments, app processing device 300 comprises a plugin executing module 350. The plugin executing module 350 is configured to run an app plugin. For example, the plugin executing module 350 can run the determined app plugin (e.g., the app plugin determined by the plugin determining module 340). The plugin executing module 350 can be configured to update at least one of the app plugins (e.g., one of the app plugins determined by the plugin determining module 340), or to delete at least one of the app plugins (e.g., one of the app plugins determined by the plugin determining module 340).

In some embodiments, app processing device 300 comprises a loading module 360. The loading module 360 can be configured to inform the user of app plugins that are available for the user terminal (e.g., the mobile terminal). After the plugin determining module 340 determines the app plugin and before the plugin executing module 350 runs the app plugin which was determined, the loading module 360 loads the app plugin which was determined into the app configuration file corresponding to the app plugin.

In some embodiments, the plugin executing module 350 is configured to allocate the same process identifier to at least two of the app plugins which were determined and to run at least two app plugins. A particular app plugin of the at least two app plugins which has been allocated the same process identifier is able to invoke the resources of the other of the at least two app plugins which have been allocated the same process identifier while the particular app plugin is running.

In some embodiments, the installing of the plugin installation package comprises determining whether the plugin installation package is compatible with the local operating system of the mobile terminal based at least in part on an interface identifier in the plugin installation package. In the event that the plugin installation package (e.g., the interface identifier in the plugin installation package) is compatible with the local operating system of the mobile terminal, the plugin installation package is run (e.g., executed). The interface identifier in the plugin installation package is used to indicate the local operating system that is compatible with the plugin installation package.

In some embodiments, the plugin identifier sending module 310 is configured to display at least one plugin identifier sent by the server, to receive a plugin identifier selection instruction, to select a plugin identifier from among one or more plugin identifiers in accordance with the plugin identifier selection instruction, and to send the selected plugin identifier to the server. In some embodiments, the plugin identifier sending module 310 is configured to display plugin descriptive information corresponding to at least one plugin sent by the server, to receive the plugin selection instruction, and to send the selected plugin identifier to the server.

In some embodiments, app processing device 300 comprises a sending module 370. The sending module 370 is configured to send function call requests to the app plugin which was determined. In some embodiments, app processing device 300 comprises a receiving module 380. The receiving module 380 is configured to receive function call results sent back by the sending module 370.

In some embodiments, app processing device 300 comprises a first interface (not shown). The first interface is configured to send a function call request to the app plugin which was determined. In some embodiments, app processing device 300 comprises a second interface. The second interface is configured to receive a function call result sent back from the app plugin which was determined.

According to various embodiments, limited flexibility and the resulting possible mismatch between installed apps and the app functions needed by users of some related art are reconciled by sending a plugin identifier to a server, requesting and acquiring an app plugin that can implement specific functions, installing the app plugin, and looking up the app plugin. Various embodiments support the actual needs of the user because local apps have the appropriate functions.

The modules (or sub-modules) described above can be implemented as software components executing on one or more general purpose processors, as hardware such as programmable logic devices and/or Application Specific Integrated Circuits designed to perform certain functions, or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Figure 4:
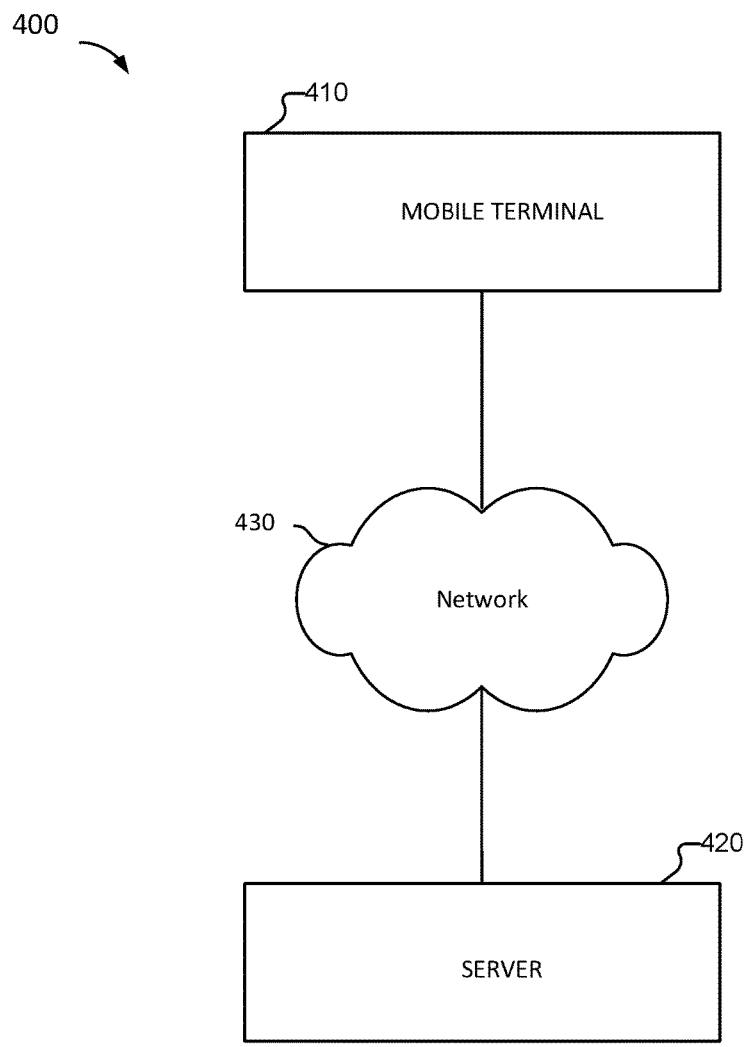
FIG. 4 is a diagram of a system for processing an app according to various embodiments of the present application.

FIG. 4 is a diagram of a system for processing an app according to various embodiments of the present application.

Referring to FIG. 4, system 400 for processing an app is provided. System 400 can implement process 100 of FIG. 1 or process 250 of FIG. 2B. System 400 can implement app processing device 300 of FIG. 3. For example, app processing device 300 can correspond to, or otherwise be comprised in, a mobile terminal 410 of system 400.

System 400 includes a mobile terminal 410 and a server 420. The system 400 can further include a network 430 over which the mobile terminal 410 and the server 420 can communicate.

Figure 5:
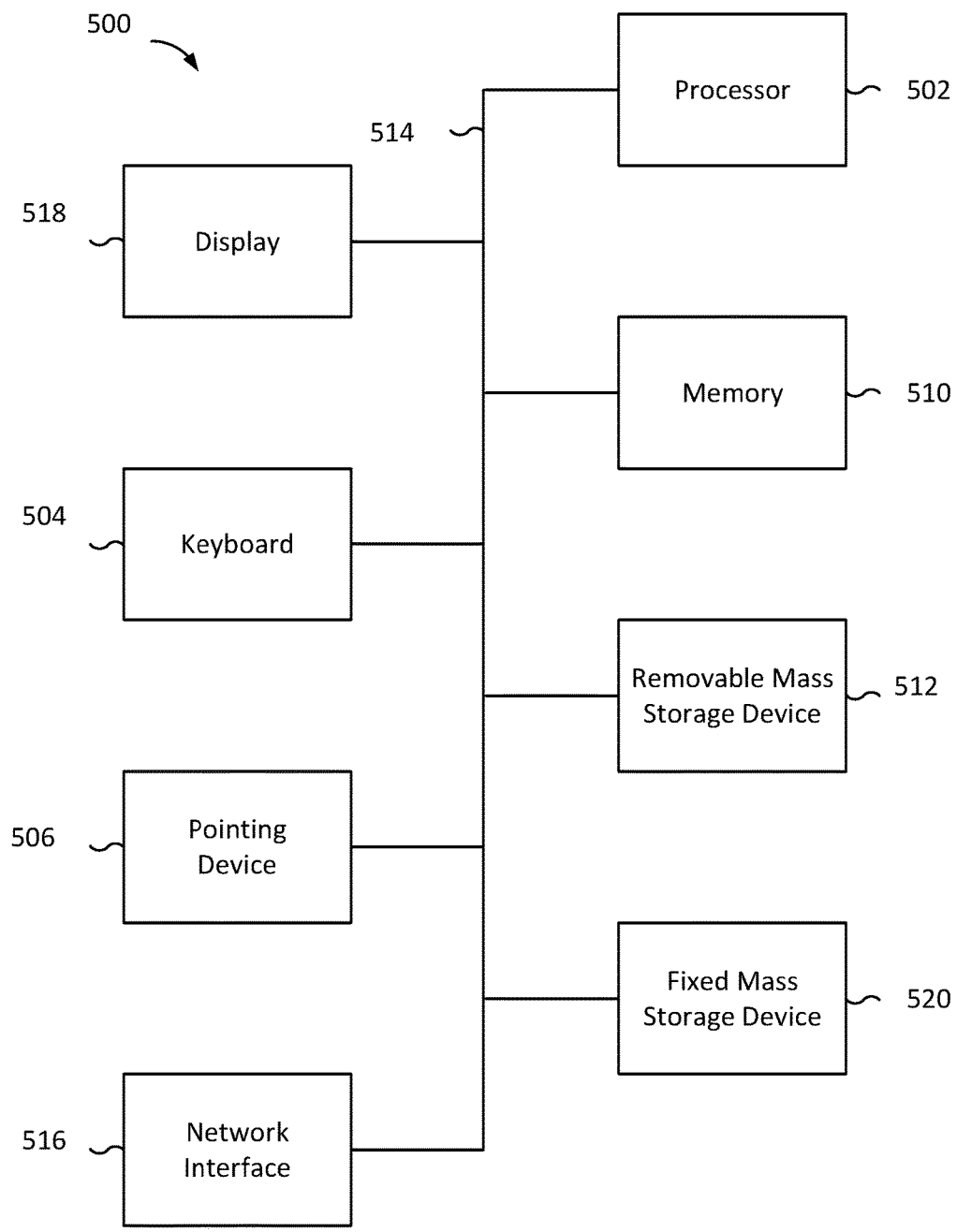
FIG. 5 is a functional diagram of a computer system for processing an app according to various embodiments of the present application.

FIG. 5 is a functional diagram of a computer system for processing an app according to various embodiments of the present application.

Referring to FIG. 5, a computer system 500 for processing an app is displayed. As will be apparent, other computer system architectures and configurations can be used to detect a specified identifier. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown). The memory can be a non-transitory computer-readable storage medium.

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage device 512 and fixed mass storage 520 generally store additional programming instructions, data, and the like that typically are not in active use by the processor 502. It will be appreciated that the information retained within mass storage device 512 and fixed mass storage 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

A person skilled in the art should understand that the embodiments of the present invention can be provided as methods, systems or computer software products. Therefore, the present invention may take the form of complete hardware embodiments, complete software embodiments, or embodiments that combine software and hardware. Moreover, the present invention may take the form of computer program products implemented on one or more computer-operable storage media (including but not limited to magnetic disk storage, CD-ROMs, and optical storage) containing computer-operable program code.

The present invention is described with reference to flow charts and/or block diagrams based on methods, equipment (systems) and computer program products of the present invention. Please note that each flow chart and/or block diagram within the flowcharts and/or block diagrams and combinations of flow charts and/or block diagrams within the flowcharts and/or block diagrams can be realized by computer commands. One can provide these computer commands to a general-purpose computer, a specialized computer, an embedded processor, or the processor of other programmable data equipment so as to give rise to a machine, with the result that the commands executed through the computer or processor of other programmable data equipment give rise to a device that is used to realize the functions designated by one or more processes in a flow chart and/or one or more blocks in a block diagram.

These computer program commands can also be stored on specially-operating computer-readable storage devices that can guide computers or other programmable data equipment, with the result that the commands stored on these computer-readable devices give rise to commodities that include command devices. These command devices realize the functions designated in one or more processes in a flow chart and/or one or more blocks in a block diagram.

These computer program commands can also be loaded onto a computer or other programmable data equipment, with the result that a series of operating steps is executed on a computer or other programmable equipment so as to give rise to computer processing. In this way, the commands executed on a computer or other programmable equipment provide steps for realizing the functions designated by one or more processes in a flow chart and/or one or more blocks in a block diagram In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, other magnetic storage equipment, or any other non-transmission media that can be used to store information that is accessible to computers. As defined in this document, computer-readable media does not include temporary computer-readable media, (transitory media), such as modulated data signals and carrier waves.

Please also note that the term "comprise" or "contain" or any of their variants are to be taken in their non-exclusive sense. Thus, processes, methods, merchandise, or equipment that comprises a series of elements not only comprises those elements, but also comprises other elements that have not been explicitly listed or elements that are intrinsic to such processes, methods, merchandise, or equipment. In the absence of further limitations, elements that are limited by the phrase "comprises a(n) . . . " do not exclude the existence of additional identical elements in processes, methods, merchandise, or equipment that comprise said elements.

A person skilled in the art should understand that the embodiment of the present application can be provided as methods, systems, or computer program products. Therefore, the present application may take the form of complete hardware embodiments, complete software embodiments, or embodiments that combine software and hardware. Moreover, the present application may take the form of computer program products implemented on one or more computer-operable storage media (including but not limited to magnetic disk storage, CD-ROMs, and optical storage) containing computer-operable program code.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   obtaining, by one or more processors, a plugin identifier, wherein the plugin identifier is associated with one or more functions of an application (app);
   obtaining, by the one or more processors, an app plugin installation package from a server, wherein the app plugin installation package is associated with the plugin identifier and an app plugin;
   installing, by the one or more processors, the app plugin installation package;
   in response to a determination at least one function of the one or more functions is to be performed, generating, by the one or more processors, an app plugin lookup instruction based at least in part on the at least one function to be performed;
   determining, by the one or more processors, that the app plugin is to be used in connection with performing the at least one function, the determining that the app plugin is to be used being based at least in part on the app plugin lookup instruction and the plugin identifier corresponding to the app plugin; and
   in response to determining the app plugin is to be used in connection with performing the at least one function, loading, by the one or more processors, the app plugin into an app configuration file before the app plugin is invoked, wherein the app plugin implements the one or more functions of the app.

2. The method of claim 1, wherein the one or more functions of the app implemented by the app plugin correspond to a subset of all functions of the app.

3. The method of claim 1, wherein the installing of the app plugin installation package comprises determining whether the app plugin installation package is compatible with a local operating system.

4. The method of claim 3, wherein the app plugin installation is determined to be compatible with the local operating system based at least in part on an interface identifier associated with the app plugin installation package, the interface identifier indicating a compatibility of the app plugin installation package with a compatible operating system.

5. The method of claim 1, wherein the determining of the app plugin comprises: determining an app identifier based at least in part on the app plugin lookup instruction, and using the app identifier to locate, from among locally installed app plugins, the app plugin associated with the plugin identifier that matches the app identifier.

6. The method of claim 5, wherein, in the event that two or more app plugins are determined, executing the app plugin, comprising:
   allocating an identical process identifier to at least two of the determined app plugins; and running at least two of the determined app plugins, wherein one of the app plugins which has been allocated the identical process identifier has access to a resource of one or more other app plugins which have been allocated the identical process identifier.

7. The method of claim 1, further comprising:
determining that the at least one function is to be performed in response to a request to execute the app.

8. The method of claim 1, wherein the app plugin implements a subset of functions of the app.

9. The method of claim 1, further comprising one or more of:
executing the app plugin;
updating the app plugin; or
deleting the app plugin.

10. The method of claim 1, wherein the app configuration file is associated with the app.

11. The method of claim 1, wherein the installing of the app plugin installation package further comprises:
in response to a determination that the app plugin installation package is compatible with a local operating system, running the app plugin installation package.

12. The method of claim 1, wherein the obtaining of the plugin identifier comprises:
displaying at least one plugin identifier sent by the server;
receiving a plugin identifier selection instruction;
selecting the plugin identifier in accordance with the plugin identifier selection instruction; and
sending the selected plugin identifier to the server.

13. The method of claim 1, wherein the obtaining the plugin identifier comprises:
displaying plugin descriptive information corresponding to at least one app plugin sent by the server;
receiving a plugin selection instruction; and
sending the plugin identifier to the server.

14. The method of claim 1, further comprising:
sending a function call request to the app plugin; and
receiving a function call result sent back by the app plugin.

15. The method of claim 14, wherein the function call request is sent via a first interface to the app plugin and the function call result sent back from the app plugin is received via a second interface.

16. A device, comprising:
at least one processor configured to:
obtain a plugin identifier, wherein the plugin identifier is associated with one or more functions of an application (app);
obtain an app plugin installation package from a server, wherein the app plugin installation package is associated with the plugin identifier and an app plugin;
install the app plugin installation package;
in response to a determination at least one function of the one or more functions is to be performed, generate an app plugin lookup instruction based at least in part on the at least one function to be performed;
determine that the app plugin is to be used in connection with performing the at least one function, the determining that the app plugin is to be used being based at least in part on the app plugin lookup instruction and the plugin identifier corresponding to the app plugin; and
in response to determining that the app plugin is to be used in connection with performing the at least one function, load the app plugin into an app configuration file before the app plugin is invoked, wherein the app plugin implements the one or more functions of the app; and
a memory coupled to the at least one processor and configured to provide the at least one processor with instructions.

17. A computer program product, the computer program product being embodied in a non-transitory computer readable storage medium and comprising computer instructions for:
obtaining, by one or more processors, a plugin identifier, wherein the plugin identifier is associated with one or more functions of an application (app);
obtaining, by the one or more processors, an app plugin installation package from a server, wherein the app plugin installation package is associated with the plugin identifier and an app plugin;
installing, by the one or more processors, the app plugin installation package;
in response to a determination at least one function of the one or more functions is to be performed, generating, by the one or more processors, an app plugin lookup instruction based at least in part on the at least one function to be performed;
determining, by the one or more processors, that the app plugin is to be used in connection with performing the at least one function, the determining that the app plugin is to be used being based at least in part on the app plugin lookup instruction and the plugin identifier corresponding to the app plugin; and
in response to determining the app plugin is to be used in connection with performing the at least one function, loading, by the one or more processors, the app plugin into an app configuration file before the app plugin is invoked, wherein the app plugin implements the one or more functions of the app.

18. A method, comprising:
obtaining, by the one or more processors, a plugin identifier, wherein the plugin identifier is associated with one or more functions of an application (app);
obtaining, by the one or more processors, an app plugin installation package from a server, wherein the app plugin installation package is associated with the plugin identifier and an app plugin;
installing, by the one or more processors, the app plugin installation package;
obtaining, by the one or more processors, an app plugin lookup instruction associated with the app plugin;
determining, by the one or more processors, the app plugin according to the app plugin lookup instruction, the determining of the app plugin comprising determining an app identifier based at least in part on the app plugin lookup instruction, and using the app identifier to locate, from among locally installed app plugins, the app plugin associated with the plugin identifier that matches the app identifier; and
in response to a determination that two or more app plugins correspond to the app plugin lookup instruction, executing the app plugin, comprising:
allocating an identical process identifier to at least two of the determined app plugins; and
running at least two of the determined two or more app plugins, wherein one of the app plugins which has been allocated the identical process identifier has access to a resource of one or more other app plugins which have been allocated the identical process identifier.

19. The method of claim 18, wherein the app plugin lookup instruction is obtained and the app plugin is determined in response to the app plugin being installed or uninstalled.

* * * * *

UNITED STATES PATENT AND TRADEMARK OFFICE
CERTIFICATE OF CORRECTION

PATENT NO. : 10,152,316 B2
APPLICATION NO. : 15/385703
DATED : December 11, 2018
INVENTOR(S) : Xi et al.

Page 1 of 1

It is certified that error appears in the above-identified patent and that said Letters Patent is hereby corrected as shown below:

In the Specification

In Column 10, Line 10, delete "public void run(AHContactsPluginInterface api) {" and insert --public void run(AliContactsPluginInterface api) {--, therefor.

Signed and Sealed this
Second Day of April, 2019

Andrei Iancu
*Director of the United States Patent and Trademark Office*